United States Patent
Yamamoto et al.

(10) Patent No.: US 12,518,628 B2
(45) Date of Patent: Jan. 6, 2026

(54) INFORMATION PROCESSING DEVICE

(71) Applicant: TOYOTA JIDOSHA KABUSHIKI KAISHA, Toyota (JP)

(72) Inventors: Shusuke Yamamoto, Tokyo (JP); Chikara Okazaki, Gotemba (JP); Kohta Watatsu, Nagoya (JP); Hideyuki Tanaka, Nisshin (JP); Shinya Murase, Nagoya (JP); Yuki Tatsumoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 18/382,131

(22) Filed: Oct. 20, 2023

(65) Prior Publication Data

US 2024/0144824 A1 May 2, 2024

(30) Foreign Application Priority Data

Nov. 2, 2022 (JP) ................... 2022-176680

(51) Int. Cl.
*G08G 1/14* (2006.01)
*G06V 20/13* (2022.01)

(52) U.S. Cl.
CPC ............. *G08G 1/145* (2013.01); *G06V 20/13* (2022.01); *G06V 2201/08* (2022.01)

(58) Field of Classification Search
CPC ..... G08G 1/145; G06V 20/13; G06V 2201/08
See application file for complete search history.

(56) References Cited

U.S. PATENT DOCUMENTS

| | | | | |
|---|---|---|---|---|
| 11,170,236 B2* | 11/2021 | Adelsberger | ......... | G06V 20/586 |
| 11,651,689 B2* | 5/2023 | Saxena | ................ | G06V 20/182 |
| | | | | 701/538 |
| 2015/0104070 A1* | 4/2015 | Tabb | ...................... | G06V 10/48 |
| | | | | 382/104 |
| 2023/0025490 A1* | 1/2023 | Koiji | .................... | B60W 30/06 |

FOREIGN PATENT DOCUMENTS

| | | | | | |
|---|---|---|---|---|---|
| JP | H11144195 A | * | 5/1999 | | |
| JP | 2005-182504 A | | 7/2005 | | |
| JP | 2006-209429 A | | 8/2006 | | |
| JP | 2015069429 A | * | 4/2015 | | |
| JP | 2017-138639 A | | 8/2017 | | |
| JP | 2020-035073 A | | 3/2020 | | |
| JP | 2020181253 A | * | 11/2020 | ............ | B60W 30/06 |
| JP | 2021140479 A | * | 9/2021 | ............ | B60W 30/06 |
| JP | 2022018958 A | * | 1/2022 | | |
| JP | 2023017462 A | * | 2/2023 | ......... | B62D 15/0285 |
| WO | WO-2019119063 A1 | * | 6/2019 | ............ | G08G 1/142 |

* cited by examiner

Primary Examiner — Curtis A Kuntz
Assistant Examiner — James E Munion
(74) Attorney, Agent, or Firm — Oliff PLC

(57) ABSTRACT

An information processing device is provided, which includes a memory; and a processor coupled to the memory and configured to: acquire a vehicle size of a vehicle and an overhead view image of a parking lot captured in a satellite image taken of ground-level by an artificial satellite; and propose, to an occupant of the vehicle, a parking lot in which the vehicle is able to park, the parking lot being designated based on the acquired vehicle size and the acquired overhead view image.

6 Claims, 5 Drawing Sheets

INFORMATION PROCESSING DEVICE

CROSS-REFERENCE TO RELATED APPLICATION

This application is based on and claims priority under 35 USC 119 from Japanese Patent Application No. 2022-176680 filed on Nov. 2, 2022, the disclosure of which is incorporated by reference herein.

BACKGROUND

Technical Field

The present disclosure relates to an information processing device.

Related Art

Japanese Patent Application Laid-Open (JP-A) No. 2006-209429 discloses a parking guidance navigation system that, when a parking space has opened while a vehicle is searching for a parking space in a parking lot, quickly guides the vehicle thereto.

Note that with the technology of JP-A No. 2006-209429, there are cases when parking is not possible in an empty parking space to which a vehicle has been guided owing to the large size of the vehicle, and there is still room for improvement.

SUMMARY

Accordingly, the present disclosure provides an information processing device capable of proposing a parking lot suitable for a vehicle size of a vehicle to an occupant of the vehicle.

An information processing device according to a first aspect of the present disclosure includes an acquisition unit configured to acquire a vehicle size of a vehicle and an overhead view image of a parking lot captured in a satellite image taken of ground-level by an artificial satellite; and a proposal unit configured to propose, to an occupant of the vehicle, a parking lot in which the vehicle is able to park, the parking lot being designated based on the vehicle size and the overhead view image acquired by the acquisition unit.

In the first aspect, the acquisition unit acquires a vehicle size of a vehicle and an overhead view image of a parking lot captured in a satellite image taken of ground-level by an artificial satellite. Then, the proposal unit proposes, to the occupant, a parking lot in which the vehicle is able to park, the parking lot being designated based on the vehicle size and the overhead view image acquired by the acquisition unit. This enables the information processing device to propose a parking lot suitable for the vehicle size of the vehicle to an occupant.

A second aspect of the present disclosure is the first aspect, further including a receiving unit configured to receive input by the occupant of a space size of a parking space, in which the proposal unit is configured to propose, to the occupant, a parking lot having a parking space of a size equal to or larger than the space size received by the receiving unit.

In the second aspect, the receiving unit receives input of a space size of a parking space by an occupant. Then, the proposal unit proposes, to the occupant, a parking lot having a parking space of a size equal to or larger than the space size received by the receiving unit. This enables the information processing device to propose a parking lot that enables an occupant to park in a desired space size.

A third aspect of the present disclosure is the first or second aspect, further including a receiving unit configured to receive a selection by the occupant of a parking position in a parking lot, in which the proposal unit is configured to propose, to the occupant, a parking lot in which parking is possible in the parking position received by the receiving unit.

In the third aspect, the receiving unit receives a selection by an occupant of a parking position in a parking lot. Then, the proposal unit proposes, to the occupant, a parking lot in which parking is possible at the parking position received by the receiving unit. This enables the information processing device to propose a parking lot that enables an occupant to park at a desired parking position.

A fourth aspect of the present disclosure is any of the first to third aspects, in which the acquisition unit is configured to acquire occupant information regarding the occupant, and the proposal unit is configured to propose, to the occupant, a parking lot corresponding to the occupant information acquired by the acquisition unit.

In the fourth aspect, the acquisition unit acquires occupant information. Then, the proposal unit proposes, to the occupant, a parking lot corresponding to the occupant information acquired by the acquisition unit. This enables the information processing device to propose a parking lot suitable for an occupant.

A fifth aspect of the present disclosure is the fourth aspect, in which the occupant information includes information indicating at least one of age, gender, personality, or driving skill of the occupant.

In the fifth aspect, the occupant information includes information indicating at least one of an age, gender, personality, or driving skill of the occupant. This enables the information processing device to propose a parking lot suitable for an occupant, the parking lot being designated from at least one of the age, gender, personality, or driving skill of the occupant.

As described above, the information processing device according to the present disclosure may propose a parking lot suitable for the vehicle size of the vehicle to an occupant of the vehicle.

DETAILED DESCRIPTION

Explanation follows regarding a proposal system 100 according to the present exemplary embodiment. The proposal system 100 according to the present exemplary embodiment is a system that proposes a parking lot suitable for a vehicle size of a vehicle to an occupant of the vehicle.

First Exemplary Embodiment

First, explanation follows regarding a first exemplary embodiment of the proposal system 100 according to the present exemplary embodiment.

Figure 1:
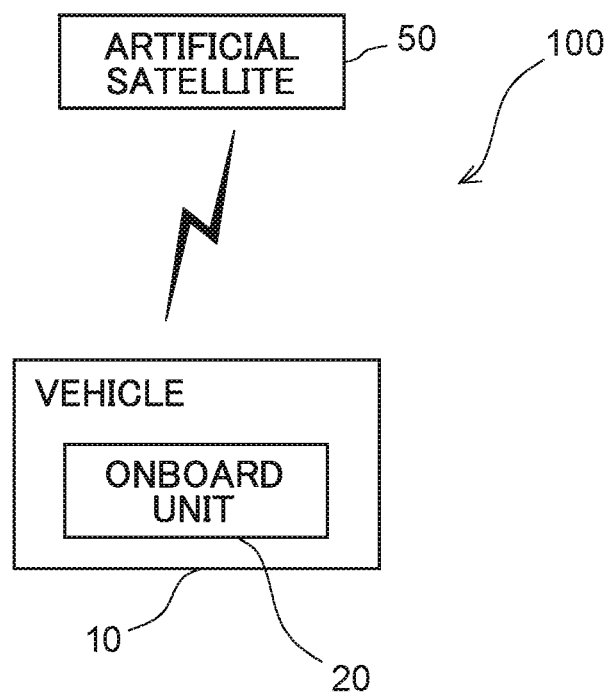
FIG. 1 is a diagram illustrating a schematic configuration of a proposal system.

FIG. 1 is a diagram illustrating a schematic configuration of the proposal system 100. As illustrated in FIG. 1, the proposal system 100 includes a vehicle 10 and an artificial satellite 50.

Although the vehicle 10 may be any of an engine vehicle, a hybrid vehicle, or an electric vehicle, in the first exemplary embodiment, as an example, the vehicle 10 is an engine vehicle. An onboard unit 20 installed in the vehicle 10 acquires an image (hereafter also referred to as a "satellite image") captured by the artificial satellite 50 from the artificial satellite 50. Note that the satellite image may be, for example, an image in which a range from 0.5 km to 20 km square of ground is set as an image capture target. Such ground includes land, lakes, ponds, seas, and the like. The onboard unit 20 is an example of an information processing device.

Although FIG. 1 illustrates only one satellite 50, preferably, the artificial satellite 50 is configured by plural artificial satellites capable of capturing the same point at ground-level. The number of times that the artificial satellite 50 orbits the Earth on one day, the altitude of the orbit of the artificial satellite 50, and the like are arbitrary.

Figure 2:
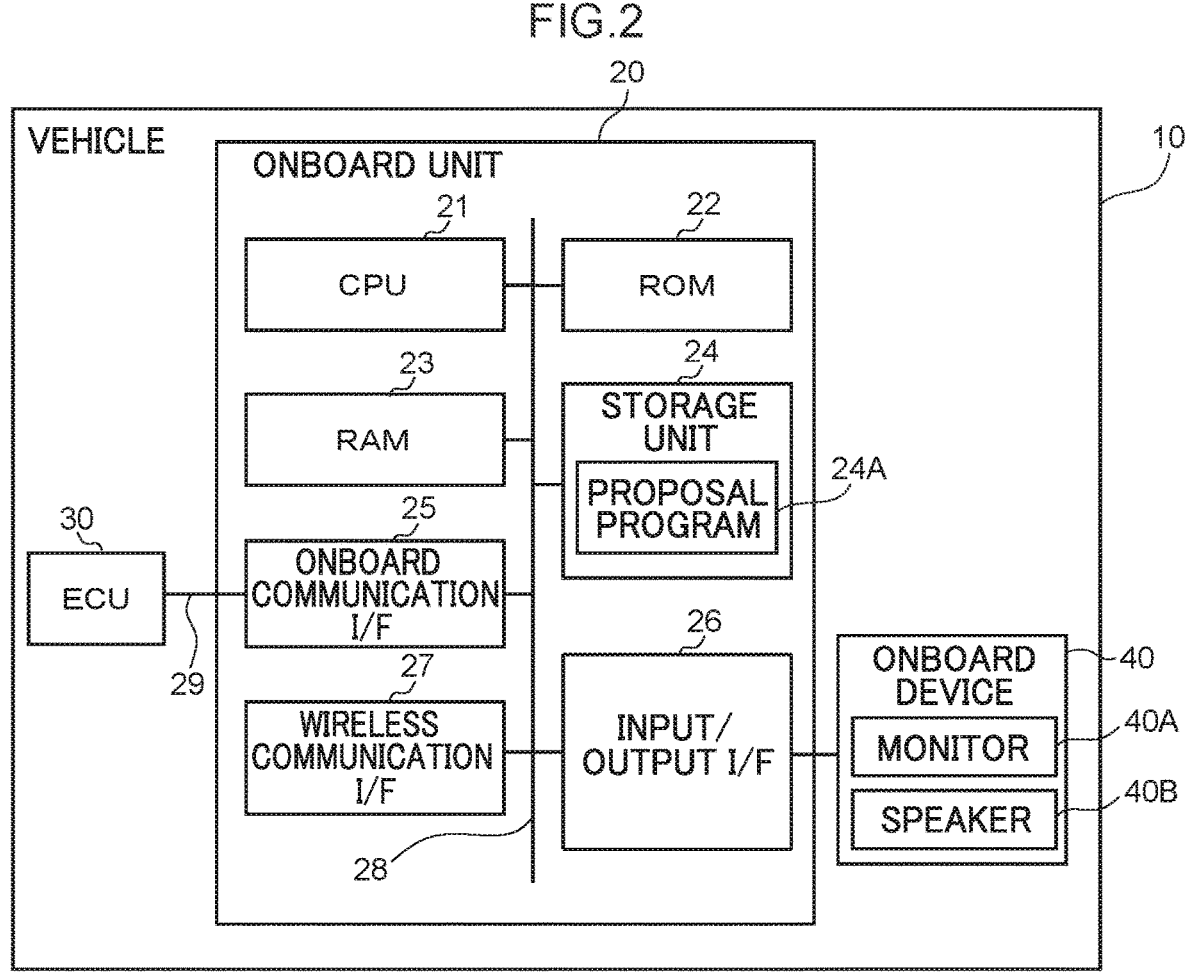
FIG. 2 is a block diagram illustrating a hardware configuration of a vehicle.

Next, explanation follows regarding a hardware configuration of the vehicle 10. FIG. 2 is a block diagram illustrating a hardware configuration of the vehicle 10.

As illustrated in FIG. 2, the vehicle 10 is configured including an onboard unit 20, an electronic control unit (ECU) 30, and an onboard device 40.

The onboard unit 20 is configured including a central processing unit (CPU) 21, read only memory (ROM) 22, random access memory (RAM) 23, a storage unit 24, an internal communication interface (I/F) 25, an input/output I/F 26, and a wireless communication I/F 27. The CPU 21, the ROM 22, the RAM 23, the storage unit 24, the onboard communication I/F 25, the input/output I/F 26, and the wireless communication I/F 27 are connected so as to be capable of communicating with each other through an internal bus 28.

The CPU 21 is a central processing unit that executes various programs and controls various units. Namely, the CPU 21 reads a program from the ROM 22 or the storage unit 24, and executes the program using the RAM 23 as a workspace. The CPU 21 controls the respective configurations and performs various computation processing according to a program recorded in the ROM 22 or the storage unit 24.

The ROM 22 holds various programs and various data. The RAM 23 serves as a workspace to temporarily store programs and data.

The storage unit 24 is configured by a storage device such as an embedded multi-media card (eMMC) or universal flash storage (UFS), and holds various programs and various data. The storage unit 24 holds a proposal program 24A for causing the CPU 21 to execute proposal processing, described below.

The onboard communication I/F 25 is an interface for connecting to the ECU 30. A communication protocol based on the CAN protocol is used for the interface. The onboard communication I/F 25 is connected to an external bus 29. Although not illustrated in the drawings, plural ECUs 30 are provided for the respective functions of the vehicle 10.

The input/output I/F 26 is an interface for communicating with the onboard device 40 installed in the vehicle 10.

The onboard device 40 includes various devices installed in the vehicle 10. The vehicle 10 includes a monitor 40A and a speaker 40B as examples of the onboard device 40.

The monitor 40A is provided on an instrument panel, a meter panel, or the like, and is a liquid crystal monitor that proposes operation relating to functionality of the vehicle 10, and displays images and the like relating to explanation of the functionality. The monitor 40A may be provided as a touch panel that also enables an input function.

The speaker 40B is provided on an instrument panel, a center console, a front pillar, a dashboard, or the like, and is a device that proposes operation relating to functionality of the vehicle 10, and that outputs sound and the like relating to explanation of the functionality. Note that the speaker 40B may be provided in the monitor 40A.

The wireless communication OF 27 is a wireless communication module for communicating with the exterior. For example, a communication standard such as 5G, LTE, Wi-Fi® or the like is used for the wireless communication module.

Figure 3:
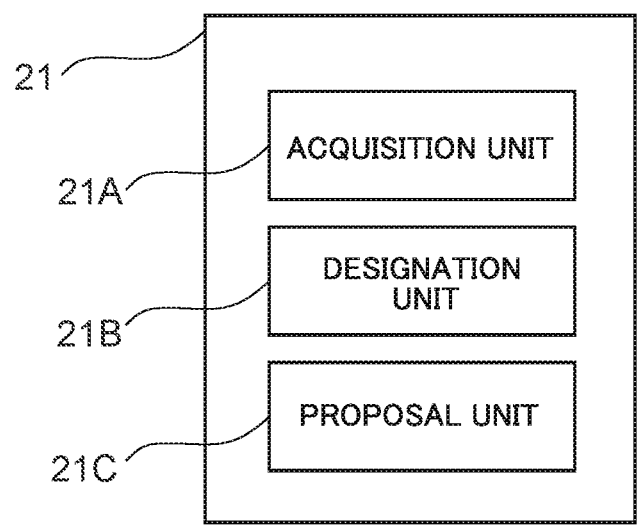
FIG. 3 is a first block diagram illustrating an exemplary functional configuration of a vehicle.

Next, explanation follows regarding the functional configuration of the vehicle 10. FIG. 3 is a first block diagram illustrating an example of the functional configuration of the vehicle 10.

As illustrated in FIG. 3, the CPU 21 of the onboard unit 20 includes an acquisition unit 21A, a designation unit 21B, and a proposal unit 21C as functional configuration. The respective functional configuration is implemented by the CPU 21 reading and executing the proposal program 24A stored in the storage unit 24.

The acquisition unit 21A acquires the vehicle size of the vehicle 10 and an overhead view image of the parking lot represented by the satellite image captured of ground-level by the artificial satellite 50. The vehicle size includes at least the overall length and width of the vehicle 10, and may also include the overall height of the vehicle 10. As an example, the vehicle size is stored in the storage unit 24, and the acquisition unit 21A acquires the vehicle size from the storage unit 24. The above-mentioned parking lot is an outdoor flat parking lot or a mechanical parking lot. Moreover, the acquisition unit 21A acquires from the satellite image an image in which is displayed, as the overhead view image described above, the surroundings of the current location of the vehicle 10 acquired from a global positioning system (GPS) device (not illustrated) serving as the onboard device 40, or a parking lot present in the surroundings of a destination set in a car navigation device (not illustrated) serving as the onboard device 40.

The designation unit 21B identifies a parking lot in which the vehicle 10 can park, based on the vehicle size and the overhead view image acquired by the acquisition unit 21A. Note that a "parking lot in which the vehicle 10 can park" in the first exemplary embodiment is a parking lot which has an empty parking space in which another vehicle is not parked, and in which the space size of the vacant parking space is larger than the vehicle size of the vehicle 10 by a predetermined value or more. Note that the space size of the parking space includes the width and length of the parking space.

As an example, the designation unit 21B, using known image recognition technology, designates a parking lot including an empty parking space in which no other vehicle is parked from the overhead view image acquired by the acquisition unit 21A. The designation unit 21B then compares the space size of the vacant parking space calculated using known image recognition technology with the vehicle size acquired by the acquisition unit 21A, and in a case in which the space size is larger than the vehicle size by a predetermined value or more, the parking lot including the vacant parking space is designated as a parking lot in which the vehicle 10 can park.

The proposal unit 21C proposes, to an occupant of the vehicle 10, a parking lot designated by the designation unit 21B in which the vehicle 10 can park. As an example, the proposal unit 21C causes a parking lot in which the vehicle 10 can park to be displayed on the monitor 40A using at least one of characters or images, and causes a sound indicating a parking lot in which the vehicle 10 can park to be output from the speaker 40B.

Figure 4:
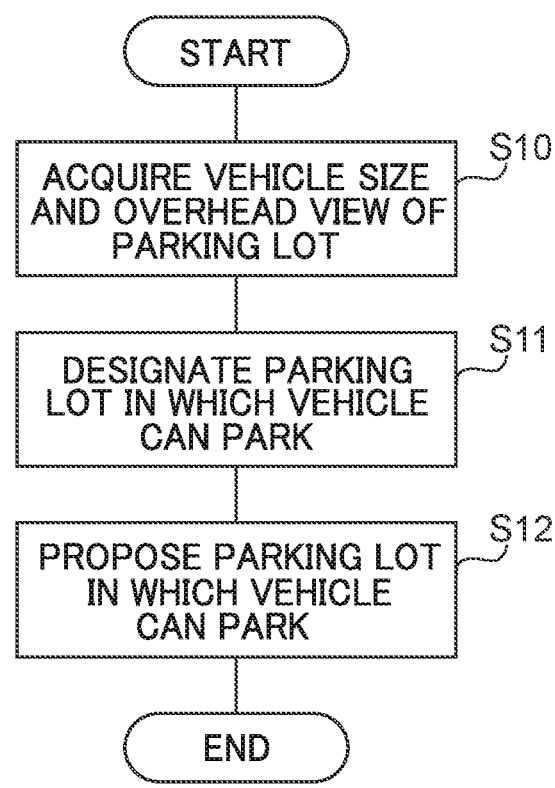
FIG. 4 is a flow chart illustrating a flow of proposal processing.

FIG. 4 is a flowchart illustrating a flow of proposal processing in which the onboard unit 20 proposes a parking lot suitable for a vehicle size of the vehicle 10 to an occupant. The proposal processing is performed by the CPU 21 reading, from the storage unit 24, the proposal program 24A, and expanding and executing the program in the RAM 23.

At step S10 illustrated in FIG. 4, the CPU 21 acquires the vehicle size of the vehicle 10 from the storage unit 24, and the artificial satellite 50 acquires an overhead view image of the parking lot that is displayed in the satellite image taken of ground-level. Then, the CPU 21 proceeds to step S11. As an example, the CPU 21 periodically acquires satellite images from the artificial satellite 50.

At step S11, based on the vehicle size and the overhead view image acquired at step S10, the CPU 21 designates a parking lot in which the vehicle 10 can park. Then, the CPU 21 proceeds to step S12.

At step S12, the CPU 21 proposes, to an occupant of the vehicle 10, a parking lot designated in step 11 at which the vehicle 10 can park. Then, the CPU 21 ends the proposal processing.

As described above, in the onboard unit 20 according to the first exemplary embodiment, the CPU 21 acquires the vehicle size of the vehicle 10 and an overhead view image of the parking lot shown in the satellite image taken of ground-level by the artificial satellite. The CPU 21 then proposes to the occupant a parking lot in which the vehicle 10 can park, designated based on the acquired vehicle size and the overhead view image. This enables the onboard unit 20 to propose a parking lot suitable for the vehicle size of the vehicle 10 to an occupant. Moreover, the CPU 21 continuously acquires overhead view images of the parking lot captured by the plural satellites 50 (e.g., every second), and by continuously identifying parking lots in which the vehicle 10 can park (e.g., every second), the occupant may grasp the availability of parking lots in which the vehicle 10 can park during driving and almost in real time.

Second Exemplary Embodiment

Next, explanation follows regarding a second exemplary embodiment of the proposed system 100 according to the present exemplary embodiment, while omitting or simplifying portions that overlap with the above exemplary embodiment.

Figure 5:
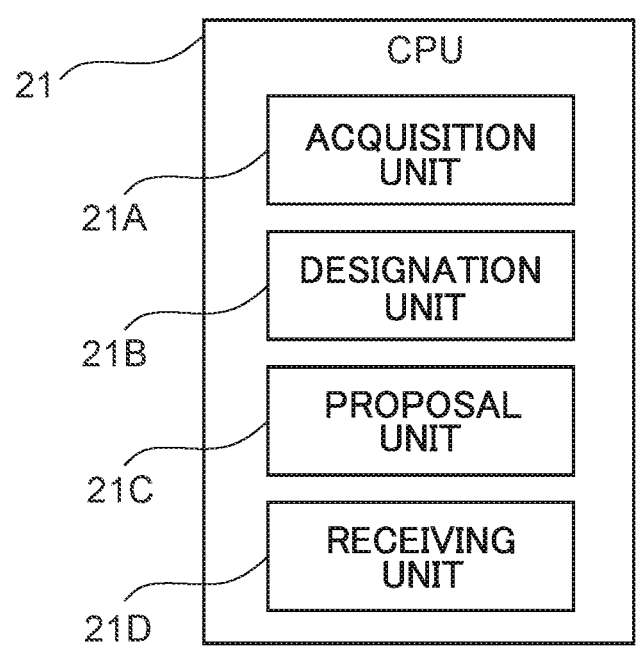
FIG. 5 is a second block diagram illustrating an exemplary functional configuration of a vehicle.

FIG. 5 is a second block diagram illustrating an example of functional configuration of the vehicle 10. Note that in the following explanation, portions that are common to the first block diagram illustrated in FIG. 3 are omitted or simplified.

As illustrated in FIG. 5, the CPU 21 of the onboard unit 20 includes an acquisition unit 21A, a designation unit 21B, a proposal unit 21C, and a receiving unit 21D as functional configuration.

The receiving unit 21D receives input of a space size of a parking space by an occupant. As an example, the receiving unit 21D causes a screen for specifying the width and length of a parking space to be displayed on the monitor 40A, and receives the width and length specified by the occupant on the screen as the space size of the parking space. Note that the space size of the parking space that can be received by the receiving unit 21D is a value equal to or larger than the vehicle size of the vehicle 10.

The designation unit 21B identifies a parking lot in which the vehicle 10 can park, based on the overhead view image acquired by the acquisition unit 21A and the space size received by the receiving unit 21D. Note that the "parking lot in which the vehicle 10 can park" in the second exemplary embodiment is a parking lot which has an empty parking space in which another vehicle is not parked, and in which the space size of the vacant parking space is equal to or larger than the space size received by the receiving unit 21D.

As an example, the designation unit 21B, using known image recognition technology, identifies a parking lot including an empty parking space in which no other vehicle is parked from the overhead view image acquired by the acquisition unit 21A. The designation unit 21B then compares the space size of the vacant parking space calculated using known image recognition technology with the space size received by the receiving unit 21D. In a case in which the space size of the vacant parking space is equal to or larger than the space size received by the receiving unit 21D, the designation unit 21B identifies the parking lot including the vacant parking space as a parking lot in which the vehicle 10 can park.

The proposal unit 21C proposes, to an occupant, a parking lot including a parking space having a space size equal to or larger than the size received by the receiving unit 21D as a parking lot designated by the designation unit 21B in which the vehicle 10 can park.

As described above, in the onboard unit 20 according to the second exemplary embodiment, the CPU 21 receives an occupant's input of the space size of the parking space. The CPU 21 then proposes to the occupant a parking lot having a parking space of a size equal to or larger than the received space size. This enables the onboard unit 20 to propose a parking lot that enables an occupant to park in a desired space size.

Third Exemplary Embodiment

Next, explanation follows regarding a third exemplary embodiment of the proposal system 100 according to the present exemplary embodiment, while omitting or simplifying portions that overlap with the above exemplary embodiments.

A vehicle 10 according to a third exemplary embodiment has the functional configuration of the block diagram illustrated in FIG. 5, similarly to the second exemplary embodiment.

The receiving unit 21D receives an occupant's selection of a parking position in a parking lot. As an example, the receiving unit 21D causes the monitor 40A to display a screen for specifying a parking position in a parking lot, and a parking position designated by the occupant on the screen is received as the occupant's selection. Note that the receiving unit 21D receives, as a parking position, a position in which there is a wall at either the rear or the left or right of the parking space, a position at which columns are located on one or other side of the parking space, a position at which no other parking space is present on one or other side of the parking space, or the like.

Based on the vehicle size and the overhead view image acquired by the acquisition unit 21A and the parking position received by the receiving unit 21D, the designation unit 21B designates a parking lot in which the vehicle 10 can park. Note that the "parking lot in which the vehicle 10 can park" in the third exemplary embodiment is a parking lot which has an empty parking space in which no other vehicle is parked at the parking position received by the receiving unit 21D, and in which the space size of the vacant parking space is larger than the vehicle size of the vehicle 10 by a predetermined value or more.

As an example, the designation unit 21B, using known image recognition technology, identifies a parking lot including an empty parking space at the parking position received by the receiving unit 21D from the overhead view image acquired by the acquisition unit 21A. The designation unit 21B then compares the space size of the vacant parking space calculated using known image recognition technology with the vehicle size acquired by the acquisition unit 21A, and in a case in which the space size is larger than the vehicle size by a predetermined value or more, the parking lot including the vacant parking space is designated as a parking lot in which the vehicle 10 can park.

The proposal unit 21C proposes, to an occupant, a parking lot in which parking is possible at a parking position received by the receiving unit 21D, as a parking lot designated by the designation unit 21B in which the vehicle 10 can park.

As described above, in the onboard unit 20 according to the third exemplary embodiment, the CPU 21 receives the occupant's selection of a parking position in the parking lot. The CPU 21 then proposes to the occupant a parking lot in which parking is possible at the received parking position. This enables the onboard unit 20 to propose a parking lot that enables an occupant to park at a desired parking position.

Fourth Exemplary Embodiment

Next, explanation follows regarding a fourth exemplary embodiment of the proposal system 100 according to the present exemplary embodiment, while omitting or simplifying portions that overlap with the above exemplary embodiments.

A vehicle 10 according to a fourth exemplary embodiment has the functional configuration of the block diagram illustrated in FIG. 3, similarly to the first exemplary embodiment.

The acquisition unit 21A acquires occupant information relating to an occupant. The occupant information includes information indicating the age, sex, personality, and driving skill of the occupant, and indicates information such as [age: 40 years old, sex: male, personality: warm, driving skill level: experienced]. The occupant information is generated in advance and stored in the storage unit 24, and the acquisition unit 21A acquires the occupant information from the storage unit 24. For example, the occupant information is generated based on results of an inspection performed on the occupant to estimate personal traits. Note that the generated occupant information is stored in the storage unit 24 in a manner correlated with the occupant.

The designation unit 21B identifies a parking lot in which the vehicle 10 can park, based on the vehicle size, the overhead view image, and the occupant information acquired by the acquisition unit 21A. Note that the "parking lot in which the vehicle 10 can park" in the fourth exemplary embodiment is a parking lot which has an empty parking space in which no other vehicle is parked at a parking position selected based on the occupant information, and in which the space size of the vacant parking space is larger than the vehicle size of the vehicle 10 by a predetermined value or more.

As an example, the designation unit 21B, using known image recognition technology, identifies a parking lot including an empty parking space at the parking position selected based on the occupant information from the overhead view image acquired by the acquisition unit 21A. For example, the designation unit 21B selects all parking positions in the parking lot for an occupant whose driving skill level indicated by the occupant information is "experienced", and for an occupant whose driving skill level indicated by the occupant information is "inexperienced," selects some of the parking positions in the parking lot. The designation unit 21B then compares the space size of the vacant parking space calculated using known image recognition technology with the vehicle size acquired by the acquisition unit 21A, and in a case in which the space size is larger than the vehicle size by a predetermined value or more, the vacant parking lot is designated as a parking lot in which the vehicle 10 can park.

The proposal unit 21C proposes, to an occupant, a parking lot that corresponds to the occupant information acquired by the acquisition unit 21A as a parking lot designated by the designation unit 21B in which the vehicle 10 can park.

As described above, in the onboard unit 20 according to the fourth exemplary embodiment, the CPU 21 acquires occupant information. The CPU 21 then proposes to the occupant a parking lot in accordance with the acquired occupant information. This enables the onboard unit 20 to propose a parking lot suitable for an occupant.

Moreover, in the onboard device 20 according to the fourth exemplary embodiment, the occupant information includes information indicating the age, sex, personality, and driving skill of the occupant. This enables the onboard unit 20 to propose a parking lot suitable for an occupant, identified from the age, sex, personality, and driving skill of the occupant.

Other Embodiments

Although the onboard unit 20 is an example of an information processing device in the above exemplary embodiment, there is no limitation thereto, and another device (e.g., a server) that is capable of acquiring satellite images from the artificial satellite 50 may be an example of an information processing device, or a combination of the onboard unit 20 and other devices may be an example of an information processing device. For example, in a case in which another device is exemplified as an information processing device, a parking lot designated by the other device in which the vehicle 10 can park is transmitted to the vehicle 10, and by reporting the information indicating the parking lot via the onboard device 40 of the vehicle 10, a proposal is made to the occupant.

Although the CPU 21 acquires the vehicle size from the storage unit 24 of the vehicle 10 in the exemplary embodiment described above, there is no limitation thereto, and the vehicle size may be stored in another device (e.g., a server) that is different from the vehicle 10, and the vehicle size may be acquired from the other device.

Although in the above exemplary embodiment, the occupant information includes information indicating the age, sex, personality, and driving skill of the occupant, the occupant information may include at least one of information indicating the age, sex, personality, or driving skill of the occupant.

Note that the proposal processing executed by the CPU 21 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The proposal processing may be executed by any one of these various types of processor, or by a combination of two or more of the same type or different types of processor (such as plural FPGAs, or a combination of a CPU and an FPGA). Further, the hardware structure of these various types of processors is more specifically an electric circuit combining circuit elements such as semiconductor elements.

Although explanation has been given regarding an aspect in which the proposal program 24A is stored (installed) in advance in the storage unit 24 in the above exemplary embodiments, there is no limitation thereto. The proposal program 24A may be provided in a format recorded on a recording medium such as compact disc read only memory (CD-ROM), digital versatile disc read only memory (DVD-ROM), or universal serial bus (USB) memory. Alternatively, the proposal program 24A may be provided in a format downloadable from an external device over a network.

What is claimed is:

1. An information processing device, comprising:
a memory; and
a processor coupled to the memory and configured to:
acquire a vehicle size of a vehicle and an overhead view image of a parking lot captured in a satellite image taken of ground-level by an artificial satellite; and
receive a selection by an occupant of a parking position in a parking lot, the selection of the parking position including a position in which there is a wall at rear, left or right of the parking position; a position at which columns are located at one or other side of the parking position; or a position at which no other parking space is present on one or other side of the parking position; and
propose, to an occupant of the vehicle, a parking lot for the vehicle to park, based on the acquired vehicle size, the acquired overhead view image, and the received selection of the parking position.

2. The information processing device of claim 1, wherein the processor is configured to:
receive input by the occupant of a space size of a parking space; and
propose, to the occupant, a parking lot having a parking space of a size equal to or larger than the received space size.

3. The information processing device of claim 1, wherein the processor is configured to:
acquire occupant information regarding the occupant, and
propose, to the occupant, a parking lot corresponding to the acquired occupant information.

4. The information processing device of claim 3, wherein the occupant information includes information indicating at least one of age, gender, personality, or driving skill of the occupant.

5. The information processing device of claim 4, wherein the processor is configured to:
when the driving skill of the occupant is a first level, select all parking positions in the parking lot as candidates for proposal, and when the driving skill of the occupant is a second level, select some of parking positions in the parking lot as candidates for proposal.

6. The information processing device of claim 1, wherein the processor is configured to:
propose, to the occupant, a parking lot that has at least one empty parking space in which no other vehicle is parked at one or more parking positions corresponding to the received selection of the parking position, and in which the space size of the at least one empty parking space is larger than the vehicle size of the vehicle by a predetermined value or more.

* * * * *